(12) United States Patent
Padilla-Acevedo et al.

(10) Patent No.: US 9,617,413 B2
(45) Date of Patent: Apr. 11, 2017

(54) CURABLE EPOXY RESIN COMPOSITIONS

(71) Applicant: Dow Global Technologies LLC, Midland, MI (US)

(72) Inventors: Angela I. Padilla-Acevedo, Lake Jackson, TX (US); Theofanis Theofanous, Lake Jackson, TX (US); Nikhil E. Verghese, Lake Jackson, TX (US); Fabio Aguirre Vargas, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/422,198

(22) PCT Filed: Sep. 25, 2013

(86) PCT No.: PCT/US2013/061726
§ 371 (c)(1),
(2) Date: Feb. 18, 2015

(87) PCT Pub. No.: WO2014/055305
PCT Pub. Date: Apr. 10, 2014

(65) Prior Publication Data
US 2015/0218364 A1 Aug. 6, 2015

Related U.S. Application Data

(60) Provisional application No. 61/706,278, filed on Oct. 1, 2012.

(51) Int. Cl.
*C08L 63/04* (2006.01)
*C08L 63/00* (2006.01)
*C08G 59/08* (2006.01)
*C08G 59/24* (2006.01)
*C08G 59/50* (2006.01)

(52) U.S. Cl.
CPC .............. *C08L 63/04* (2013.01); *C08G 59/08* (2013.01); *C08G 59/245* (2013.01); *C08G 59/504* (2013.01); *C08L 63/00* (2013.01)

(58) Field of Classification Search
CPC ................................ C08L 63/00; C08L 63/04
See application file for complete search history.

(56) References Cited

U.S. PATENT DOCUMENTS 9,056,942 B2 *  6/2015  Padilla-Acevedo ....... C08J 5/24
9,057,002 B2 *  6/2015  Padilla-Acevedo ....... C08J 5/24
9,169,417 B2 * 10/2015  Marks .................. C08G 18/003
(Continued)

FOREIGN PATENT DOCUMENTS

WO    WO 2011163282 A2 * 12/2011  ........... C08G 59/027

OTHER PUBLICATIONS

Dow Product Information D.E.N. 431 Aug. 27, 2010.*

*Primary Examiner* — Megan McCulley (57) ABSTRACT

A curable composition including (a) at least one epoxide compound comprising: (i) at least one solid or semi-solid epoxy resin; and (ii) at least one divinylarene dioxide resin compound; and (b) at least one hardener; wherein the curable composition being cured comprises a cured thermoset product having a Tg of greater than about 120° C. A thermoset can be prepared from the above curable composition.

17 Claims, 2 Drawing Sheets

(56) References Cited

U.S. PATENT DOCUMENTS

| | | | |
|---|---|---|---|
| 2007/0004871 A1* | 1/2007 | Lu | C08G 65/48 |
| | | | 525/396 |
| 2011/0160327 A1* | 6/2011 | Occhielio | C08G 18/003 |
| | | | 521/156 |
| 2011/0184091 A1 | 7/2011 | Mizuki et al. | |
| 2012/0214958 A1* | 8/2012 | Marks | C08G 59/02 |
| | | | 528/73 |
| 2013/0059127 A1* | 3/2013 | Peters | C08G 65/485 |
| | | | 428/195.1 |
| 2013/0059945 A1* | 3/2013 | Marks | C08G 59/027 |
| | | | 523/456 |
| 2013/0096232 A1* | 4/2013 | Theophanous | C08G 59/027 |
| | | | 523/400 |
| 2013/0251931 A1* | 9/2013 | Liao | C09D 163/00 |
| | | | 428/36.91 |
| 2015/0210906 A1* | 7/2015 | Liang | C09J 163/00 |
| | | | 523/427 |
| 2015/0247031 A1* | 9/2015 | Xie | C08L 51/04 |
| | | | 523/438 |

* cited by examiner

CURABLE EPOXY RESIN COMPOSITIONS

FIELD

The present invention is related to a curable epoxy resin formulation or composition; and more specifically to a curable resin composition having a high Tg and a high char yield sufficient for the epoxy resin composition to be used for manufacturing a high performance composite.

BACKGROUND

Epoxy resins and epoxy prepregs including carbon fiber prepregs are known to be useful for aerospace applications. For such aerospace applications, it is important that the resulting prepregs have a high glass transition temperature (Tg) [for example greater than 160° C.] and a high char yield (for example having a char residue of greater than or equal to 35 percent [%] residue) for fire resistance.

For example, US 2011/0184091 discloses a hot-melt prepreg used in the aerospace industry employing (1) two or more epoxy resins, wherein one of the epoxy resins contains an oxazolidone ring structure, and (2) 4,4'-diaminophenylsulfone (DDS) as the curing agent. While the composition disclosed in US 2011/0184091 provides cured product useful in the aerospace industry, there is still room for improving the composition including providing a balance of properties such as a high Tg and a high char yield of the cured product made from the composition. In addition, US 2011/0184091 does not disclose the use of low viscosity epoxy resins such as divinylbenzene dioxide epoxidized cyclohexane tetraphenol (CHTP) or divinylbenzene dioxide (DVBDO) to prepare curable epoxy resin compositions.

Figure 1:
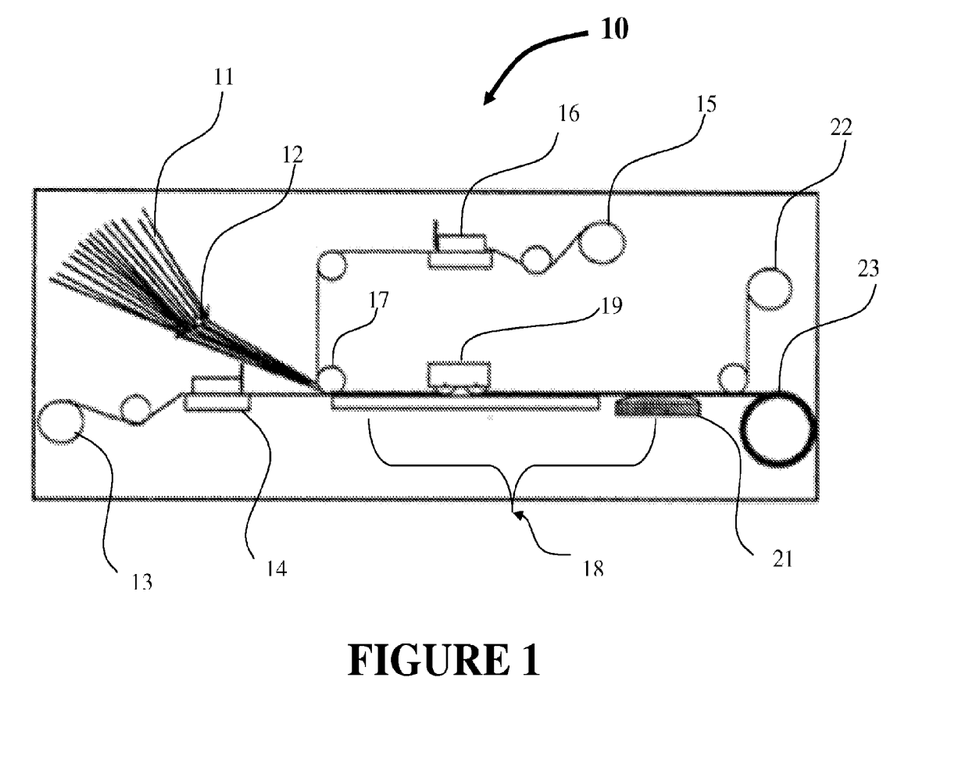
FIG. 1 is schematic representation of a hot-melt prepregging process.

Typically, a carbon fiber prepreg is produced via a known hot-melt process as shown in FIG. 1. The hot-melt prepreg process consists of film casting followed by prepreg formation and composites that are cured under a bag or in autoclave. Typical characteristics of an epoxy resin composition for a hot-melt process include solvent-free, high viscosity of the unreacted mixture (this characteristic is key in order to form a film) and latency of the chemistry during film formation. In addition, the "B-staging" phase of the process for making a prepreg is largely achieved by tuning the viscosity of the composition. Furthermore, the degree of "tack" at the B-stage ranges from low to high.

Typical compositions for hot-melt prepreg contain diluents such as cycloaliphatic and aliphatic epoxies, low viscosity liquid epoxy resins (LER) and other reactive diluents in order to tune the viscosity to the desired processability range. However, the use of reactive diluents can result in decreased thermal and mechanical properties, lower glass transition temperatures (Tg) and lower char yield for fire resistance.

What is needed in the field of preparing epoxy prepregs which include carbon fiber prepregs particularly for aerospace applications is epoxy resin compositions for preparing prepregs that exhibit a combination and balance of advantageous properties including for example processability, Tg, mechanical performance and char yield.

SUMMARY

The present invention is directed to a curable epoxy resin formulation or composition having a high Tg and a high char yield resin composition for use in high performance composites. The present invention epoxy resin composition can be used, for example, for preparing carbon fiber prepregs via a hot-melt process. Such carbon fiber prepregs advantageously do not contain conventional epoxy diluents such as cycloaliphatic epoxies or other liquid epoxy resins.

One embodiment of the present invention is directed to a curable resin formulation or composition including:
(a) at least one epoxide compound comprising:
  (i) at least one solid or semi-solid epoxy resin; and
  (ii) at least one divinylarene dioxide resin compound; and
(b) at least one hardener;
wherein the curable composition being cured comprises a cured thermoset product having a Tg of greater than about 120° C.

In one preferred embodiment, the at least one divinylarene dioxide resin compound (ii) used in the present invention may be divinylbenzene dioxide (DVBDO). Generally, divinylarene dioxide such as DVBDO have a viscosity of less than or equal to about 12 mPa·s, in one embodiment; less than or equal to about 9 mPa·s in another embodiment; and less than or equal to about 8 mPa·s in still another embodiment.

In another embodiment, the at least one epoxide compound, component (i) can include at least one novolac epoxy resin.

Another embodiment of the present invention is directed to a thermoset prepared from the above curable composition for use as a high performance composite made from the above epoxy composition.

The epoxy compositions of the present invention provide epoxy resin thermoset products having properties comparable to or exceeding industry accepted high performance epoxies (for example, Tactix 556 cured with 4,4'-diaminophenylsulfone (DDS) and which can be used in the aerospace industry.

Still other embodiments of the present invention are directed to a process for preparing the above curable composition and a process for preparing a thermoset product from the above epoxy composition wherein the thermoset can be useful for a high performance composite.

The compositions described in the present invention can be processed via a hot-melt process to produce carbon fiber prepreg and composites; and such prepregs can be consolidated in vacuum bag and tested. The compositions of the present invention can be used for aerospace hot-melt prepregs due to the processability, performance and thermal properties of the compositions.

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings.

DETAILED DESCRIPTION

"Processability" with reference to a resin composition herein means a resin system with a melt viscosity of from about 1 Pa·s to about 10 Pa·s at temperatures of above about 70° C.; and a melt viscosity of from about 40 Pa·s to about 500 Pa·s at a temperature of about 50° C.

"Solvent-free" with reference to a composition herein means a composition containing no solvent or at least less than about 1 weight percent (wt %) solvent. Minor or trace amounts of solvent can be present in a composition which is a result of contamination of raw materials.

"High glass transition temperature" or "high Tg" herein means a Tg of greater than or equal to 160° C.

"High performance" with reference to an epoxy resin composition used in the aerospace industry such as Tactix 556 cured with 4,4'-diaminophenylsulfone (DDS), herein means a composition having a glass transition temperature (Tg) in the range of from about 162° C. to about 165° C.

"High char yield" or "percent (%) char" with reference to a composition herein means a composition having a char residue of greater than or equal to about 35% residue at about 550° C. Preferably, the % char of a composition described herein can be in the range of from about 35% residue to about 50% residue at about 550° C.

"Low viscosity" with reference to an epoxy resin herein means an epoxy resin having a viscosity of less than or equal to about 12 mPa·s. For example, the divinylarene dioxide resin employed in the present invention has a low viscosity. DVBDO, for example has a viscosity of less than or equal to about 12 mPa·s in one embodiment; less than or equal to about 9 mPa·s in another embodiment; and less than or equal to about 8 mPa·s in still another embodiment.

"Latency" herein means the onset temperature of reaction above the melt-viscosity at about 80° C.

"Tuning the viscosity property" with reference to a composition herein means a composition having a viscosity in the following ranges: viscosity in the range of from about 50 Pa·s to about 250 Pa·s at a temperature of about 50° C.; and a melt viscosity in the range of from about 1 Pa·s to about 10 Pa·s at temperatures of from about 80° C. to about 85° C.;

"Degree of "tack" at the B-stage" herein can be measured in terms of viscosity at about 50° C.; and herein means a viscosity in the range of from about 50 Pa·s to about 250 Pa·s.

A broad embodiment of the present invention is directed to providing a curable resin formulation or composition including (a) at least one epoxide compound comprising: (i) at least one solid or semi-solid epoxy resin; and (ii) at least one divinylarene dioxide resin; and (b) at least one hardener. Other optional additives known to the skilled artisan can be included in the curable composition such as for example a curing catalyst and other additives for various enduse applications.

In one embodiment, a broad scope of component (a) useful in the curable composition of the present invention includes for example a combination of at least two epoxy compounds including (i) at least one solid or semi-solid epoxy resin; and (ii) at least one divinylarene dioxide resin such as DVBDO, wherein the curable composition, when cured, the combination of the above two epoxy resins in the curable composition, results in a cured thermoset having a high Tg.

The curable composition of the present invention may include at least one solid or semi-solid epoxy resin compound as component (i) to form the epoxy matrix in a final curable composition. For example, the solid or semi-solid epoxy resin compound useful in the present invention may include any conventional solid or semi-solid epoxy compound.

One embodiment of the solid or semi-solid epoxy compound used in the curable composition of the present invention, may be for example a single epoxy compound used alone; or a combination of two or more epoxy compounds known in the art such as any of the epoxy compounds described in Lee, H. and Neville, K., *Handbook of Epoxy Resins*, McGraw-Hill Book Company, New York, 1967, Chapter 2, pages 2-1 to 2-27, incorporated herein by reference. In a preferred embodiment, the epoxy compound may include for example epoxy resins based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy compound may also be selected from commercially available epoxy resin products such as for example, D.E.R. 331®, D.E.R.332, D.E.R. 354, D.E.R. 580, D.E.N. 425, D.E.N. 431, D.E.N. 438, D.E.R. 736, or D.E.R. 732 epoxy resins available from The Dow Chemical Company.

The epoxy compound may also be selected from commercially available epoxy resin products such as solid epoxy resins (SER) including for example, D.E.R.™ 660, D.E.R.™ 6508, D.E.R.™ 671, D.E.R.™ 642U-20, D.E.R.™ 661, D.E.R.™ 642U, D.E.R.™ 6116, D.E.R.™ 662E, D.E.R.™ 6225, D.E.R.™ 692, D.E.R.™ 692H, D.E.R.™ 692HB, D.E.R.™ 6224, D.E.R.™ 662UH, D.E.R.™ 6615, D.E.R.™ 663UE, D.E.R.™ 663U, D.E.R.™ 672U-20, D.E.R.™ 663-A25, D.E.R.™, 672U, D.E.R.™ 663UK, D.E.R.™ 6330-A10, D.E.R.™ 640, D.E.R.™ 664UE, D.E.R.™ 664U, D.E.R.™ 6155, D.E.R.™ 666E, D.E.R.™ 6670, D.E.R.™ 667-20, D.E.R.™ 667E, D.E.R.™ 668-20, D.E.R.™ 669E, D.E.R.™ 669-20, D.E.R. 6510-HT, D.E.R. 6508, epoxidized cyclohexane tetraphenol (eCHTP), D.E.N. 438, D.E.N. 439, resins commercially available under the tradename "Tactix" such as Tactix 556, Tactix 742, Tactix 756, MY 720; or mixtures thereof.

Generally, the solid or semi-solid epoxy resins are determined to be "solid" and "semi-solid" based on the viscosity of the epoxy resin at room temperature (about 25° C.). In addition; the viscosity of a solid or semi-solid epoxy resin useful in the present invention is generally a high viscosity. For example, in one embodiment, the viscosity range of the solid or semi-solid epoxy compound used in the curable composition of the present invention may be between about 0.1 Pa·s to about 50 Pa·s at the processing temperatures which can be from about 50° C. to about 180° C. The table below describes a few non-limiting examples of aromatic epoxy resins that exhibit the above viscosities.

| SOLID EPOXY RESINS | TEMP FOR VISCOSITY MEASUREMENT (° C.) | VISCOSITY RANGE (PA-S) | SOFTENING TEMPERATURE (° C.) | EPOXIDE EQUIVALENT WEIGHT |
|---|---|---|---|---|
| D.E.R. 642U-20 | 150 | 1.9-3.3 | 99-97 | 500-560 |
| D.E.R. 662E | 150 | 0.9-2.0 | 87-93 | 590-630 |
| D.E.R. 6508 | 150 | 2.8-4.2 | 95-105 | 380-420 |
| D.E.R. 6510-HT | 150 | 7.0-9.5 | 105-114 | 410-440 |
| D.E.N. 438 | 51.7 | 31.0-40.0 | n/a | 176-181 |
| eCHTP | 150 | 2.5 | 75-80 | 206 |
| Tactix 556 | 79 | 2.3 | 53 | 225 |

Generally, the solid or semi-solid epoxy compound used in the curable composition of the present invention may be, for example, a high viscosity solid epoxy resin having a viscosity in the range of from about 0.1 Pa·s to about 15 Pa·s at the processing temperatures which can be from about 50° C. to about 180° C., in one embodiment; from about 0.5 Pa·s to about 10 Pa·s in another embodiment; from about 1 Pa·s to about 5 Pa·s in still another embodiment; and from about 0.9 Pa·s to about 4.2 Pa·s in yet another embodiment. Also useful in the present invention are epoxy compounds such as epoxy novolacs having a viscosity in the range of from about 2 Pa·s to about 60 Pa·s in another embodiment, and from about 20 Pa·s to about 40 Pa·s in still another embodiment.

Generally, the amount of solid or semi-solid epoxy compound used in the curable composition of the present invention, may be for example, from about 5 wt % to about 95 wt % in one embodiment, from about 10 wt % to about 90 wt % in another embodiment; from about 20 wt % to about 80 wt % in still another embodiment; and from about 30 wt % to about 70 wt % in yet another embodiment, based on the total weight of the composition. For concentrations above about 95 wt % of a solid or semi-solid epoxy resin, the resulting blend is unlikely to fulfill the melt viscosity criteria required in the present invention.

The curable composition of the present invention may include at least one divinylarene dioxide. Such divinylarene dioxide compounds generally have a low viscosity. The divinylarene dioxide compound useful in the present invention is, in general, an aromatic polyfunctional liquid epoxy resin compound and forms the epoxy matrix in a final curable composition. For example, the low viscosity divinylarene dioxide liquid epoxy resin compound useful in the present invention may include at least one aromatic epoxy resin compound or a combination of two or more epoxy resin compounds, wherein at least one of the epoxy resin compounds is a divinylarene dioxide resin compound. For example, one preferred embodiment of the low viscosity divinylarene dioxide resin compound useful in the present invention may be DVBDO which can have a viscosity of less than or equal to 12 mPa·s.

In one embodiment, the divinylarene dioxide useful in the curable composition of the present invention may include any of the divinylarene dioxides described in U.S. patent application Ser. No. 13/133,510, incorporated herein by reference.

In another embodiment, the divinylarene dioxide useful in preparing the curable composition of the present invention may include, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthalene, and tetrahydronaphthalene. Homologously bonded (substituted) benzenes may consist of biphenyl, and diphenylether.

The divinylarene dioxide used for preparing the formulations or compositions of the present invention may be illustrated generally by chemical Structures I-IV as follows:

Structure I

-continued

Structure II

Structure III

Structure IV

In the above Structures I, II, III, and IV of the divinylarene dioxide useful in the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide useful in the present invention may be produced, for example, by the process described in U.S. Patent Provisional Application Ser. No. 61/141,457, filed Dec. 30, 2008, by Marks et al., incorporated herein by reference. In another embodiment, the divinylarene dioxides useful in the present invention are disclosed in, for example, U.S. Pat. No. 2,924,580.

In still another embodiment, the divinylarene dioxide useful in the present invention may include, for example, DVBDO, divinylnaphthalene dioxide, divinylbiphenyl dioxide, divinyldiphenylether dioxide, or mixtures thereof.

In one preferred embodiment of the present invention, the divinylarene dioxide used in the curable composition of the present invention can be for example DVBDO. Divinylarene dioxides such as for example DVBDO are a class of diepoxides which have a relatively low liquid viscosity but a higher rigidity and crosslink density than conventional epoxy resins.

In another preferred embodiment, the divinylarene dioxide compound useful in the present invention includes, for example, a DVBDO as illustrated by the following chemical formula of Structure V:

Structure V

The chemical formula of the above DVBDO compound may be as follows: $C_{10}H_{10}O_2$; the molecular weight of the DVBDO is 162.2; and the elemental analysis of the DVBDO is: C, 74.06; H, 6.21; and O, 19.73 with an epoxide equivalent weight of 81 g/mol.

Structure VI below illustrates another embodiment of a preferred chemical structure of the DVBDO useful in the present invention:

Structure VI

Structure VII below illustrates still another embodiment of a preferred chemical structure of the DVBDO useful in the present invention:

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from 9:1 to 1:9 ratio of meta (Structure VI) to para (Structure VII) isomers. The present invention preferably includes as one embodiment a range of from 6:1 to 1:6 ratio of Structure VI to Structure VII, and in other embodiments the ratio of Structure VI to Structure VII may be from 4:1 to 1:4 or from 2:1 to 1:2.

In yet another embodiment of the present invention, the divinylarene dioxide may contain quantities (such as for example less than 20 wt %) of substituted arenes and/or arene oxides. The amount and structure of the substituted arenes and/or arene oxides mixed with a divinylarene dioxide composition depends on the process used in the preparation of the divinylarene precursor which is, in turn, used to prepare the divinylarene dioxide. For example, the divinylarene precursor such as divinylbenzene (DVB) can be prepared by the dehydrogenation of diethylbenzene (DEB), and the resultant product composition may contain quantities of ethylvinylbenzene (EVB) and DEB. During the dehydrogenation reaction of DEB, wherein an oxidant such as hydrogen peroxide, the EVB present in the reaction mixture can react with hydrogen peroxide to produce ethylvinylbenzene oxide while DEB remains unchanged. The presence of ethylvinylbenzene oxide and DEB in the divinylarene dioxide can increase the epoxide equivalent weight of the divinylarene dioxide to a value greater than that of a pure divinylarene dioxide compound.

In one embodiment, the divinylarene dioxide, (for example DVBDO) useful in the present invention comprises a low viscosity liquid epoxy resin. For example, the viscosity of the divinylarene dioxide used in the present invention ranges generally from 0.001 Pa·s to 0.1 Pa·s in one embodiment, from 0.01 Pa·s to 0.05 Pa·s in another embodiment, and from 0.01 Pa·s to 0.025 Pa·s in still another embodiment, at 25° C.

One advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, N.Y., 1993. The rigidity of the divinylarene dioxide used in the present invention may range generally from 6 to 10 rotational degrees of freedom in one embodiment, from 6 to 9 rotational degrees of freedom in another embodiment, and from 6 to 8 rotational degrees of freedom in still another embodiment.

The divinylarene dioxide useful in the present invention curable composition may optionally be used with other aromatic epoxy resins known in the art other than the divinylarene dioxide. The optional aromatic epoxy resin, other than the divinylarene dioxide, may be may be substituted or unsubstituted. The optional aromatic epoxy resin may be monomeric or polymeric. The optional aromatic epoxy resin may include a single aromatic epoxy resin or may include a combination of two or more aromatic epoxy resins.

For example, the optional aromatic epoxy resin useful in the present invention may include, one or more aromatic epoxy resin compounds described in Pham, H. Q. and Marks, M. J., *Epoxy Resins*, the Kirk-Othmer Encyclopedia of Chemical Technology; John Wiley & Sons, Inc—online Dec. 4, 2004 and in the references therein; in Lee, H. and Neville, K., *Handbook of Epoxy Resins*, McGraw-Hill Book Company, New York, 1967, Chapter 2, pages 2-1 to 2-33, and in the references therein; May, C. A. Ed., *Epoxy Resins: Chemistry and Technology*, Marcel Dekker Inc.: New York, 1988 and in the references therein; and in U.S. Pat. No. 3,117,099; all of which are incorporated herein by reference.

In a preferred embodiment, the aromatic epoxy compound may include for example epoxy resins based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy compound may also be selected from commercially available epoxy resin products such as for example, D.E.R. 331®, D.E.R.332, D.E.R. 354, D.E.R. 580, D.E.N. 425, D.E.N. 431, D.E.N. 438, D.E.R. 736, D.E.R. 732, D.E.R.™ 660, D.E.R.™ 6508, D.E.R.™ 671, D.E.R.™ 642U-20, D.E.R.™ 661, D.E.R.™ 642U, D.E.R.™ 6116, D.E.R.™ 662E, D.E.R.™ 6225, D.E.R.™ 692, D.E.R.™ 692H, D.E.R.™ 692HB, D.E.R.™ 6224, D.E.R.™ 662UH, D.E.R.™ 6615, D.E.R.™ 663UE, D.E.R.™ 663U, D.E.R.™ 672U-20, D.E.R.™ 663-A25, D.E.R.™, 672U, D.E.R.™ 663UK, D.E.R.™ 6330-A10, D.E.R.™ 640, D.E.R.™ 664UE, D.E.R.™ 664U, D.E.R.™ 6155, D.E.R.™ 666E, D.E.R.™ 6670, D.E.R.™ 667-20, D.E.R.™ 667E, D.E.R.™ 668-20, D.E.R.™ 669E, D.E.R.™ 669-20D.E.R. 6510-HT, D.E.R. 6508, epoxidized cyclohexane tetraphenol eCHTP, D.E.N. 438, D.E.N. 439, Tactix 556, or mixtures thereof. The D.E.R. and D.E.N. epoxy resins are available from The Dow Chemical Company.

Generally, the viscosity of the divinylarene dioxide epoxy compound at 25° C. (ambient temperature) used in the curable composition of the present invention, may be for example, from about 0.001 Pa·s to about 100 Pa·s in one embodiment, from about 0.01 Pa·s to about 50 Pa·s in another embodiment; from about 0.1 Pa·s to about 10 Pa·s in still another embodiment; and from about 1 Pa·s to about 5 Pa·s in yet another embodiment. As aforementioned, one preferred embodiment of the divinylarene dioxide having a low viscosity can be DVBDO which exhibits a viscosity of less than or equal to about 12 mPa·s.

Generally, the amount of divinylarene dioxide compound used in the curable composition of the present invention, may be for example, from about 5 wt % to about 95 wt % in one embodiment, from about 10 wt % to about 90 wt % in another embodiment; from about 20 wt % to about 80 wt % in still another embodiment; and from about 30 wt % to about 70 wt % in yet another embodiment, based on the total weight of the composition. The divinylarene dioxide resin component of the present invention composition should be present in the composition; otherwise, the viscosity of the overall blend is too high to fulfill the melt viscosity ranges described previously.

In general, a curing agent (also referred to as a hardener or crosslinking agent), component (b), is blended with the epoxy resin compound, component (a), to prepare the curable composition. The curing agent may include, for example, any conventional curing agent known in the art useful for including in a curable composition. The curing agent useful in the curable composition, may be selected, for example, but are not limited to, anhydrides, carboxylic acids, amine compounds, phenolic compounds, or mixtures thereof.

Examples of curing agents useful in the present invention may include any of the co-reactive or catalytic curing materials known to be useful for curing epoxy resin based compositions. Such co-reactive curing agents include, for example, aromatic amines, polyamine, polyamide, polyaminoamide, dicyandiamide, polymeric thiol, polycarboxylic acid and anhydride, and any combination thereof or the like. Suitable catalytic curing agents include tertiary amines, imidazoles, quaternary ammonium halides, Lewis acids such as boron trifluoride, or the like; and any combination thereof. Other specific examples of co-reactive curing agent include diaminodiphenylsulfone, styrene-maleic acid anhydride (SMA) copolymers; and any combination thereof. Among the conventional co-reactive epoxy curing agents, amines and amino or amido containing resins and phenolics are preferred.

In one preferred embodiment, the hardener of the present invention may include for example 4,4'-diaminophenylsulfone (DDS), dicyandiamide, and mixtures thereof.

Generally, the amount of the curing agent used in the curable composition of the present invention will depend on the enduse of the curable composition. For example, as one illustrative embodiment, when the curable composition is used to prepare a composite, the concentration of curing agent can be generally from about 3 wt % to about 50 wt % in one embodiment, from about 10 wt % to about 45 wt % in another embodiment; from about 15 wt % to about 40 wt % in still another embodiment; from about 20 wt % to about 35 wt % in yet another embodiment, and from about 20 wt % to about 30 wt % curing agent in even yet another embodiment. The above wt % ranges correspond to about 1 equivalent of hardener for about 1 equivalent of epoxy to have a stoichiometric balance. Above these ranges, there would be unreacted hardener (i.e., all the epoxy would be consumed); and below these ranges, there would be unreacted epoxy (i.e., not enough hardener).

In preparing the curable resin formulation of the present invention, optional compounds may be used including for example at least one toughening agent or toughener to provide the resulting cured thermoset made from the curable epoxy resin compound toughness properties. For example, the toughener useful in the present invention may include core shell rubbers, silica particles, carboxyl terminated butadiene and butadiene-acrylonitrile polymers, and other commercially available tougheners such as FORTEGRA (commercially available from The Dow chemical Company); or any combination thereof.

Generally, the amount of toughener when used in the curable composition may be for example, from 0 wt % to about 40 wt % in one embodiment, from about 0.01 wt % to about 20 wt % in another embodiment; from about 0.1 wt % to about 15 wt % in still another embodiment; and from about 1 wt % to about 10 wt % in yet another embodiment. The effect on toughness as measured by fracture toughness described in ASTM D5045 depends on the amount and type toughener selected.

Another optional compound that can be used in preparing the curable resin formulation of the present invention may include for example at least one flame retardant (FR) to provide flame retardancy to the resulting cured thermoset made from the curable epoxy resin compound. For example, the flame retardant useful in the present invention may include a melamine polyphosphane such as Mellapur 200 available from Ciba, now part of BASF; a metal dialkylphosphinate such as Exolit OP 930 manufactured by Clariant; a water wash clay such as Polyfil DL available from KaMin LLC; an untreated fumed silica such as CAB-O-SIL M-5 available from CABOT; wollastonite with a typical composition of $CaSiO_3$ such as ASPECT 4992; an alumina trihydrate (ATH) such as Martinal available from Albemarle Corporation; graphite; zinc borate; isobutyl bis(hydroxypropyl) phosphine oxide such as Cyagard RF 1243 a reactive flame retardant available from Cytec; bromine containing epoxies such as for example D.E.R 560 or D.E.R 542 available from The Dow Chemical Company; or any combination thereof.

Generally, the amount of flame retardant when used in the curable composition may be for example, from 0 wt % to about 40 wt % in one embodiment, from about 0.01 wt % to about 30 wt % in another embodiment; from about 0.1 wt % to about 24 wt % in still another embodiment; and from about 1 wt % to about 20 wt % in yet another embodiment. The flame retardancy of the curable composition can be measured using UL 94, ASTM D84 or any other established method and performance will depend on the test method selected.

Other optional compounds that may be added to the curable composition of the present invention may include compounds that are normally used in resin compositions known to those skilled in the art for preparing curable compositions and thermosets. For example, the optional components may comprise compounds that can be added to the composition to enhance application properties (e.g. surface tension modifiers or flow aids), reliability properties (e.g. adhesion promoters) the reaction rate, the selectivity of the reaction, and/or the catalyst lifetime.

Other optional compounds that may be added to the curable composition of the present invention may include, for example, a cure catalyst, a solvent to lower the viscosity of the composition further, other resins such as a phenolic resin that can be blended with the epoxy resin of the composition, other epoxy resins different from the epoxy compound of the present invention (for example, aromatic and aliphatic glycidyl ethers; cycloaliphatic epoxy resins; and divinylarene dioxides such as divinylbenzene dioxide), other curing agents, fillers, pigments, flow modifiers, adhesion promoters, diluents, stabilizers, plasticizers, catalyst de-activators, and mixtures thereof.

Optionally, a lower grade of DVBDO containing a higher level of impurities such as diepoxide and monoepoxide may be used in the curable composition. While these impurities will lower the glass transition temperature, some enduses may withstand such lower glass transition temperatures.

Generally, the amount of other optional components, when used in the present invention, may be for example, from 0 wt % to about 90 wt % in one embodiment, from about 0.01 wt % to about 80 wt % in another embodiment; from about 0.1 wt % to about 70 wt % in still another embodiment; and from about 1 wt % to about 60 wt % in yet another embodiment.

In preparing the curable formulation, there is no criticality in the blending of the reaction compounds to prepare the composition of the present invention as the preparation of the curable composition may be carried out by admixing the reactant compounds by standard techniques known in the art. However, although there is no required order in mixing the compounds making up the curable composition of the present invention, in one embodiment, for example, the process for preparing the curable composition preferably may be carried out by first admixing (i) at least one solid or semi-solid epoxy resin; and (ii) at least one divinylarene dioxide to form the at least one epoxide compound, component (a). Subsequently, the epoxy compound blend can be admixed with (b) at least one hardener; and (c) any other optional ingredients as needed. For example, the preparation of the curable resin composition of the present invention may be achieved by blending, in known mixing equipment, the epoxide compound, and the curing agent, and optionally any other desirable additives. Any of the above-mentioned optional additives, for example a toughener, may be added to the composition during the mixing or prior to the mixing to form the composition.

All the compounds of the curable composition are typically mixed and dispersed at a temperature enabling the preparation of an effective curable epoxy resin composition having the desired balance of properties for a particular application.

For example, the temperature during the mixing of the epoxy compounds [the solid or semi-solid epoxy resin and the divinylarene dioxide, components (i) and (ii)] may be generally from about 25° C. to about 180° C. in one embodiment, and from about 50° C. to about 100° C. in another embodiment.

For example, the temperature during the mixing of the above epoxy blend with the hardener may be generally from about 25° C. to about 90° C. in one embodiment, and from about 50° C. to about 80° C. in another embodiment. Lower mixing temperatures help to minimize reaction of the epoxide and hardener in the composition to maximize the pot life of the composition.

The preparation of the curable composition of the present invention, and/or any of the steps thereof, may be a batch or a continuous process. The mixing equipment used in the process may be any vessel and ancillary equipment well known to those skilled in the art.

The curable resin composition of the present invention exhibit several advantages including the following advantages: (1) the room temperature "tack" of the composition can be from medium to heavy and can have a viscosity of from about 40 Pa·s to about 500 Pa·s at a temperature of about 50° C.; (2) the processability of the curable resin composition can be a latent system with a melt viscosity of from about 1 Pa·s to about 10 Pa·s at temperatures above about 70° C.; (3) the curable resin composition is a major departure from conventional knowledge of vitrification, i.e., the cure cycle of the composition can be at about 177° C. (typical about 350° F. Aerospace cure cycle) employing the hardener DDS, wherein the resulting cured product has a glass transition temperature of from about 200° C. to about 260° C.; (4) the curable resin composition, when completely cured, can have a full cure Tg after post-cure in the range of from about 230° C. to about 300° C.; and (5) the significantly higher char yield for fire resistance of the composition can be significantly higher in the range of from about 35% residue (or % char) to about 50% residue at about 550° C.

The curable resin composition of the present invention, prepared as described above, advantageously exhibit several improved properties when compared to known compositions in the art. For example, the char yield of the composition can be generally of between about 1% and about 80% in one embodiment, between about 5% and about 60% in another embodiment, and between about 10% and about 55% in still another embodiment. The char yield of the composition can be measured by thermogravimetric analysis (TGA) where s sample is oxidized at elevated temperatures and the difference in weight before and after indicates the char yield as described in ASTM E1131-08.

The process of the present invention includes curing the curable resin composition to form a thermoset or cured composition. The curing of the composition is carried out generally as described with mixing the components of the composition. For example, in the preparation of the epoxy blends, the temperature during the mixing of the epoxy components may be generally from about 25° C. to about 180° C. in one embodiment, and from about 50° C. to about 120° C. in another embodiment.

For example, in the preparation of the epoxy blend and hardener composition, the temperature of mixing may be generally from about 25° C. to about 90° C. in one embodiment, and from about 50° C. to about 80° C. in another embodiment.

The process of curing of the curable composition may be carried out at a predetermined temperature and for a predetermined period of time sufficient to cure the composition and the curing may be dependent on the hardeners used in the composition. For example, the temperature of curing the composition may be generally from about 10° C. to about 290° C. in one embodiment; from about 100° C. to about 250° C. in another embodiment; and from about 125° C. to about 200° C. in still another embodiment.

Generally, the curing time for the process of curing the curable composition may be chosen between about 1 minute to about 4 hours in one embodiment, between about 5 minutes to about 2 hours in another embodiment, and between about 10 minutes to about 1.5 hours in still another embodiment. Below a period of time of about 1 minute, the time may be too short to ensure sufficient reaction under conventional processing conditions; and above about 4 hours, the time may be too long to be practical or economical.

In another embodiment, the curable composition of the present invention can be also useful for ambient cure or forced cure such as for example high Tg coatings such as coatings used in chemical resistant tank liners or pipe coatings. In addition to DDS, other hardeners known by those skilled in the art can be used to cure for example Part A as described in the Examples herein.

Several methods known in the art can be used for forming the cured thermoset of the present invention such as a prepreg or a composition product including for example mixing the compounds of the composition or formulation to form a composition bath. The mixing equipment used in the process may be any vessel and ancillary equipment well known to those skilled in the art.

As an illustrative embodiment, the curable composition resin is mixed with a reinforcement material such as reinforcing fibers arranged to be processed according to an exemplary pultrusion process such as described in FIG. 1.

In FIG. 1 there is shown an apparatus, generally indicated by numeral 10, for fabricating a prepreg including fibers 11 passing through a comb 12. The combed fibers from comb 12 engage a bottom release paper from roll 13 passing through a doctor plate 14 and a top release paper from roll 15 passing through a doctor plate 16. These three feeds contact each other at a contact roll 17 and then the contacted combed fibers from 17 pass through an impregnation zone 18 wherein the fibers are impregnated with a curable composition of the present invention being applied to the fibers with a force at 19. After the impregnation zone 18, the impregnated fibers pass through a chill plate 21 and then the top release paper is taken up by take-up roll 22 while the prepared prepreg product is taken up by take-up roll 23.

The process of fabricating the cured product of the present invention, and/or any of the steps thereof, may be a batch or a continuous process.

The cured product (i.e. the cross-linked product made from the curable composition) prepared from the curable composition of the present invention shows several improved properties over conventional epoxy cured resins. For example, the cured product of the present invention may advantageously have a high glass transition temperature (Tg).

For example, the cured product of the present invention exhibits a Tg generally in the range of between about 100° C. and about 300° C. in one embodiment, between about 150° C. and about 275° C. in another embodiment, and between about 200° C. and about 250° C. in still another embodiment. The Tg of the cured product can be measured by the method described in ASTM such as the differential scanning calorimetry (DSC) ASTM E 1356 standard test method for assignment of the glass transitions temperatures by differential scanning calorimetry.

Tg may also be determined by dynamic mechanic analysis (DMTA) and Tg data can be obtained on a TA Instrument ARES Rheometer. In this method, specimens are cut from the cured plaques employing a wet mechanical saw. The type of test run is a dynamic temperature ramp at a frequency of 1 Hz. The temperature range scanned is from about 25° C. to about 280° C. at 5° C./minute and the sample is rescanned to the same temperature to investigate the full cure.

For a high Tg system, the Tg is about 75° C. above cure temperature (about 177° C.) without post-cure, opening the possibility for alternative cure cycles. Another advantage of the present invention is the possibility of using less expensive hardeners such as dicyandiamide in place of the more expensive aromatic amine such as DDS.

The present invention includes a full cure high Tg differentiated system with a post cure Tg at about above about 295° C. The resulting super high Tg product can be used as an alternative to bismaleimides and polyimides wherein the epoxy resin compositions of the present invention may have a much easier processability such as for example as shown in the results described in FIG. 2.

In addition to Tg, the compositions of the present invention are used to prepare a cured product having a combination of other properties that deliver a unique processability, such as mechanical performance properties and char yield balance.

High char yield for fire resistance in the range of about 35% to about 50% residue (or % char) at about 550° C. This facilitates the use of other flame retardants that can result in synergies. For example, the present invention enables the use of high viscosity solid or semi-solid epoxy resins/building blocks with DVBDO by replacing DVBDO or using DVBDO in combination with common reactive diluents such as aliphatic and cycloaliphatic epoxies; and liquid epoxy resins such as D.E.R. 332, D.E.R. 354 or cyclohexanedimethanol diglycidyl ether (CHDM-DGE). Another advantage of the use of DVBDO (low viscosity, high Tg epoxy resin) in the present invention is the possibility of employing higher loadings of toughening agents.

The curable composition of the present invention may be used to manufacture a cured thermoset product for use in applications such as for example laminate applications; and other coatings for high chemical resistance at ambient and high service temperature applications like tank and pipe liners by using the hardeners and other additives known to those skilled in the art.

The epoxy resin compositions of the present invention are used to prepare prepregs that exhibit a combination and balance of advantageous properties including for example processability, Tg, mechanical performance and char yield.

The curable composition of the present invention may also be used in applications including filament winding, pultrusion RTM (resin transfer molding) of composites used in application like aerospace, automotives, oil and gas. The curable composition may also be used as an adhesive for composites and other materials. In addition it can be sued for filled or unfilled castings.

The curable composition of the present invention may also be used in applications including electronic applications such as capillary underfill compositions and electrically conductive adhesive compositions. The curable composition may also be used as clean reactive diluents for electronic applications, electrically conductive adhesive (ECA) compositions, and for ultra violet (UV) cure applications (i.e. coatings), UV cure compositions for inks and coatings, laminate applications; and coatings for high chemical resistance at ambient and high service temperature applications like tank and pipe liners by using the hardeners and other additives known to those skilled in the art.

EXAMPLES

The following examples and comparative examples further illustrate the present invention in detail but are not to be construed to limit the scope thereof.

Various terms and designations used in the following examples are explained herein below:

"eCHTP" stands for epoxidized cyclohexane tetraphenol and this epoxy of cyclohexane tetraphenol has an average epoxy functionality of 4 and increased thermal resistance.

"DVBDO" stands for divinylbenzene dioxide.

The compositions of the present invention are prepared employing the following solid epoxy resins:

D.E.N. 438™ is a multifunctional epoxy novolac with an epoxy functionality between 2.2 and 3.8.

D.E.R. 6510-HT™ is an isocyanate modified epoxy resin with an oxazolidone ring structure incorporated into the backbone. The rigid oxazolidone-containing backbone has an average epoxy functionality of 2.4, and this type of rigid backbone structure gives increased thermal resistance (Tg) properties.

PMT-F7 is an epoxy blend commercially available from Patz Materials & Technologies.

In the present invention, the use of DVBDO, with a very low ambient temperature viscosity (e.g., less than or equal to 12 mPa·s), enables the use of solid or semi-solid epoxy resins having a high viscosity such as for example epoxy novolacs.

In addition, the glass transition temperature of thermosets that have DVBDO as one of their components is typically higher than the transition temperatures of compositions that use conventional reactive diluents.

Table I summarizes the compositions of the epoxy compositions and the glass transition temperatures of thermosets at the clear casting stage.

TABLE I

Tg Data at Clear Casting Stage

| Composition | Composition Part A: Amounts of Epoxy Resin in Weight Percentages (wt %) (Cured with DDS) | Cure Cycle (177° C.) Tg (° C.) | Post Cure (280° C.) Tg (° C.) |
|---|---|---|---|
| Control | Tactix 556 (100 wt %) | 180 | 207 |
| Example 1 | DER 6510-HT (50 wt %)-DVBDO (20 wt %)-DEN 438 (30 wt %) | 201 | 226 |
| Example 2 | eCHTP (60 wt %)-DVBDO (20 wt %)-DEN 438 (20 wt %) | 236 | 280 |
| Example 3 | DEN 438 (80 wt %)-DVBDO (5 wt %)-eCHTP (15 wt %) | 219 | 244 |

All the epoxy compositions shown in Table I were cured with stoichiometric amounts of the hardener DDS typically used as a curative in aerospace composite applications. The Tg shown in Table I was evaluated by dynamic mechanic thermal analysis (DMTA) at aerospace cure cycle temperature (about 177° C.) and at post-cure. The results indicate that the Tg of Examples 1, 2 and 3 are superior to the Tg of the control system after the prescribed cure cycle conditions and post-cure. These results demonstrate that using high viscosity building blocks in 80% by weight of Part A (epoxy) and less than or equal to about 20% by weight of DVBDO (low viscosity, high Tg monomer) results in thermosets with superior glass transition compared to the high performance of the Tactix 556 composition (Control).

TABLE II

TGA Data at Clear Casting Stage: Char Formation Characteristics

| Composition | Composition Part A: Amounts of Epoxy Resin in Weight Percentages (wt %) (Cured with DDS) | TGA % Weight Retention at 550° C. Cured to 177° C. | TGA % Weight Retention at 550° C. Post Cure to 280° C. |
|---|---|---|---|
| Control | Tactix 556 (100 wt %) | 17.1 | 17.3 |
| Example 1 | DER 6510-HT (50 wt %)-DVBDO (20 wt %)-DEN 438 (30 wt %) | 48.6 | 49.5 |
| Example 2 | eCHTP (60 wt %)-DVBDO (20 wt %)-DEN 438 (20 wt %) | 35.2 | 35.9 |
| Example 3 | DEN 438 (80 wt %)-DVBDO (5 wt %)-eCHTP (15 wt %) | 41.6 | 41.6 |

Table II summarizes the char formation characteristics and flame resistance implications of the epoxy compositions disclosed. Thermogravimetric analysis (TGA) for decomposition behavior of the thermosets at the clear castings level were obtained for thermosets cured at about 177° C. and post cured to about 280° C. The % weight results at about 550° C. is also the % residue that was obtained after subjecting the samples to a temperature ramp from ambient temperature to about 600° C. From the results shown in Table II, resin compositions of Examples 1, 2 and 3 have a char yield at about 550° C. that is at least two times greater than the char yield of the Control evaluated. The high char yield demonstrates the higher flame resistance implications of the compositions of the present invention and highlights compositions' potential advantages for use in aerospace applications.

Figure 2:
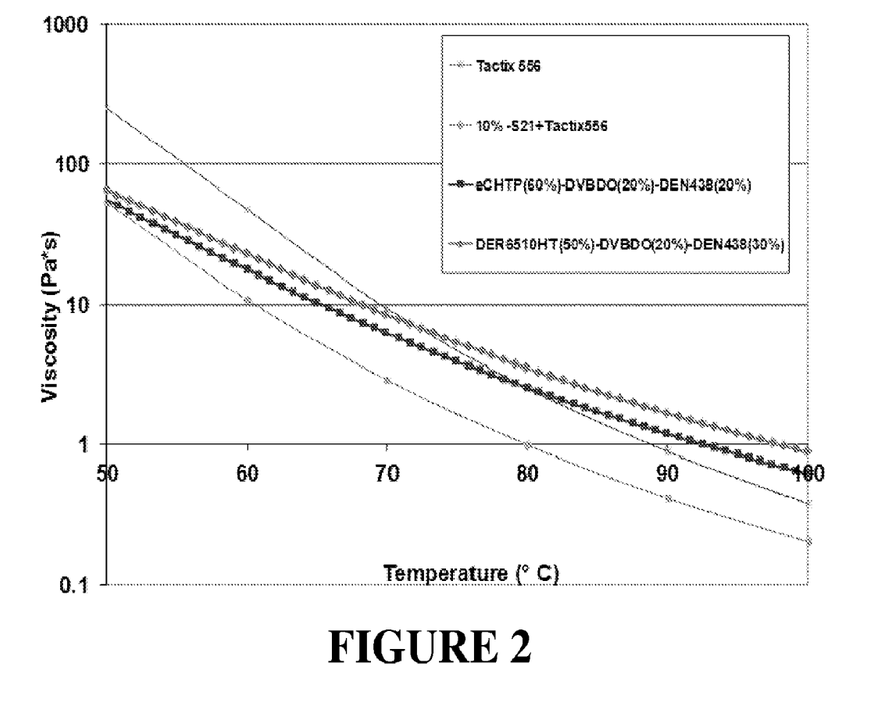
FIG. 2 is a graphical illustration showing a viscosity profile as a function of temperature of the epoxy resin composition of the present invention.

With reference to FIG. 2 there is shown a viscosity profile of the compositions of Examples 1 and 2, wherein the "tack" and melt impregnation criteria for hot melt prepregging is evaluated. The processability of the compositions was determined by evaluating the room temperature "tack" at about 50° C. in the viscosity range of about 50 Pa·s to about 250 Pa·s. Another criterion for processability was the melt viscosity of the system at 80-85° C. in the viscosity range of from about 1 Pa·s to about 10 Pa·s. The compositions were evaluated against two control systems Tactix 556 and Tactix 556/ERL 4221 (cycloaliphatic epoxy resin) and the results show that the disclosed compositions are similar to the current industry known and practiced compositions that can be processed with existing prepregging equipment.

The two compositions DER 6510-HT (50 wt %)-DVBDO (20 wt %)-DEN 438 (30 wt %) and eCHTP (60 wt %)-DVBDO (20 wt %)-DEN 438 (20 wt %) were the subject of a hot-melt prepreg process. Both compositions processed successfully, films were produced and converted into carbon fiber prepregs. Composites were consolidated in vacuum bag and tested for thermal and mechanical properties.

TABLE III

Thermal Evaluation (DMTA) of Carbon Fiber Composites (having about the same fiber volume fraction)

| Composites | Composition Part A: Amounts of Epoxy Resin in Weight Percentages (wt %) (all composites were cured with DDS) | Cure Cycle (177° C.) Tg (° C.) | Post Cure Tg (° C.) |
|---|---|---|---|
| Control | PMT-F7 | 212 | 232 |
| Example 1 | DER 6510-HT (50 wt %)-DVBDO (20 wt %)-DEN 438 (30 wt %) | 197 | 241 |
| Example 2 | eCHTP (60 wt %)-DVBDO (20 wt %)-DEN 438 (20 wt %) | 256; 284 | 297 |

TABLE IV

Flex Evaluation of Carbon Fiber Composites

| Flex Evaluation | Example 1 DER 6510-HT (50 wt %)- DVBDO (20 wt %)- DEN 438 (30 wt %) | Example 2 eCHTP (60 wt %)- DVBDO (20 wt %)- DEN 438 (20 wt %) | PMT-F7 (Control) |
|---|---|---|---|
| Average Values | | | |
| Stress at failure (MPa) | 1559 | 1719 | 1673 |
| Modulus (MPa) | 43161 | 67707 | 77152 |
| Deflection (mm) | 6.54 | 6.91 | 6.95 |
| Standard Deviations | | | |
| Stress at failure (MPa) | 125 | 249 | 151 |
| Modulus (MPa) | 8396 | 6496 | 4515 |
| Deflection (mm) | 0.65 | 0.89 | 0.72 |

TABLE V

Compression Evaluation of Carbon Fiber Composites

| Composition | Stress (psi) | Stress COV (%) | Modulus (*10⁶ psi) | Modulus COV (%) |
|---|---|---|---|---|
| Example 1 DER 6510-HT (50 wt %)-DVBDO (20 wt %)-DEN 438 (30 wt %) | 99,700 ± 4900 | 4.9 | 13.0 ± 3.2 | 24.4 |
| Example 2 eCHTP (60 wt %)-DVBDO (20 wt %)-DEN 438 (20 wt %) | 99,000 ± 3900 | 3.9 | 11.5 ± 2.8 | 24.1 |
| PMT-F7 (Control) | 89,700 ± 3300 | 3.6 | 15.8 ± 2.9 | 18.4 |

The following standard analytical equipments and test methods are used in the Examples:

Differential Scanning Calorimetry

Differential scanning calorimetry (DSC) was carried out using ASTM E 1269 standard test method for determining specific heat capacity, and ASTM E 1356 standard test method for assignment of the glass transitions temperatures by differential scanning calorimetry. The samples were run in a TA Instrument DSC Q2000. Samples of approximately 10 mg were cut from cured plaques and loaded into aluminum pans that were hermetically sealed. Pans were loaded into an autosampler on the TA Instrument DSC Q2000. The samples were scanned from 0° C.—room temperature to 280° C., ramped at 10° C./minute or 2° C./minute and rescanned to check for full cure.

Thermogravimetric Analysis

Thermogravimetric analysis (TGA) data was collected in a TA Instrument Q5000. The heating rate used was 10° C./min from 25° C. to 600° C. under nitrogen.

Dynamic Mechanic Analysis

Dynamic mechanic analysis (DMTA) data were obtained on a TA Instrument ARES Rheometer. Specimens were cut from the cured plaques employing a wet mechanical saw. The type of test run was a dynamic temperature ramp at a frequency of 1 Hz. The temperature range scanned was from 25° C. to 280° C. and in some cases from 25° C. to 360° C. at 5° C./minute and the sample was rescanned to the same temperature to investigate the full cure.

Viscosity Measurements

Viscosity measurements were performed on the AR2000 from TA Instrument. A 50 mm steel parallel plate was employed. Temperature ramp experiments were run for the temperature range of 40° C. to 100° C. at a ramp rate of 5° C./minute and a shear rate of 10 s$^{-1}$.

Tensile Properties of Neat Resin

The evaluation of tensile properties of neat resin followed ASTM D 638 procedures for testing and analysis using type I dog-bone samples. This provided tensile properties including modulus, strain at peak and break and also ultimate and break strength.

Compression Properties of Composites

Compression properties of composites were determined by testing the cured composites for compression and flex performance utilizing ASTM D 6641 and ASTM D 790, respectively.

The results of the evaluation of carbon fiber composites are summarized on Tables III, IV and V. The performance of the composites made with the two compositions, DER 6510-HT (50 wt %)-DVBDO (20 wt %)-DEN 438(30 wt %) and eCHTP (60 wt %)-DVBDO (20 wt %)-DEN 438(20 wt %), was evaluated against PMT-F7 (control).

The results demonstrate two types of systems, a standard Tg and a high Tg differentiated system (Table III). The standard Tg system DER 6510-HT (50 wt %)-DVBDO (20 wt %)-DEN 438(30 wt %) utilizes lower cost building blocks such as DER 6510 HT and DEN 438 in 80% by weight of Part A (epoxy resin). Testing of composites prepared with this composition resulted in mechanical performance comparable to the control system PMT-F7 (Tables IV and V).

The results clearly show that eCHTP (60 wt %)-DVBDO (20 wt %)-DEN 438 (20 wt %) is a high Tg (Table III) differentiated system wherein the following beneficial results were achieved:

(1) A Tg that is approximately 75° C. above cure temperature (177° C.) without post-cure. This has significant ramifications in terms of cure cycle choice given the major departure from conventional vitrification. The obvious impact of this result is the opening up of possible alternative cure cycles.

(2) A post cure Tg of the system at ~295° C. that is ~70° C. higher than the Tg of the PMT-F7 control at full cure. At the same time, the mechanical performance of the composition of the present invention is similar to the control PMT-F7 (Tables IV and V).

Example 1

Preparation of a Large Scale Composition (Part A and Part B) to Make Clear Castings or Plaques Selected compositions were scaled up to 120 g in order to make plaques for materials properties measurements. One of the compositions selected for scale up contained the following Part A epoxy blend DER 6510HT (50 wt %)-DVBDO (20 wt %)-DEN 438 (30 wt %). The Part B (where Part B refers to the hardener portion of the composition) consisted of DDS. The amounts of epoxy resins and hardeners were DER 6510-HT (45 g, 105.8 mmol), DVBDO (18 g, 222.2 mmol), DEN 438 (27 g, 151.3 mmol) and DDS (28 g, 479.4 mmol).

The preparation started by grinding solid epoxy resin DER 6510-HT to a fine powder. Next 50% DER 6510-HT was combined with 50% of the necessary DVBDO. The mixture was warmed up to 70° C. over 24 hours in a closed jar. The resulting mixture was combined with preheated DEN 438 (previously heated to 90° C.) and mixed at 90° C. The three component blend was then combined with the remaining DER 6510-HT (previously heated to 125° C.) and the remaining DVBDO. The mixture was heated to 100° C. until the mixture became homogeneous.

The castings were prepared by heating the resin mixture to 80° C. The hardener (DDS), which is in powder form, was added and mixed using the high shear mixer for ~10 min until a homogenous mixture was obtained. The resulting mixture was briefly degassed in a preheated vacuum oven and then poured into 80° C. preheated plaque molds. Cured follow a typical 350° F. cure cycle where the temperature was increased at approximately 2° C./minute form 80° C. to 177° C. followed by hold for 3 hours after which the oven was switched off. The castings were left to cool down slowly to about 25° C.

Example 2

An epoxy blend consisting of eCHTP (60 wt %)-DVBDO (20 wt %)-DEN 438 (20 wt %) and hardener DDS was prepared. The amounts of epoxy resins and hardeners were eCHTP (51 g, 248.1 mmol), DVBDO (17 g, 209.9 mmol), DEN 438 (17 g, 95.2 mmol) and DDS (34 g, 553.2 mmol).

The preparation started by grinding solid epoxy resin eCHTP to a fine powder. Next 50% eCHTP was combined with 50% of the necessary DVBDO. The mixture was warmed up to 70° C. over 24 hours in a closed jar. The resulting mixture was combined with preheated DEN 438 (previously heated to 90° C.) and mixed at 90° C. The three component blend was then combined with the remaining eCHTP (previously heated to 125° C.) and the remaining DVBDO. The mixture was heated to 100° C. until the mixture became homogeneous.

The castings were prepared by heating the resin mixture to 80° C. The hardener (DDS), which is in powder form, was added and mixed using the high shear mixer for approximately 10 minutes until a homogenous mixture was obtained. The resulting mixture was briefly degassed in a preheated vacuum oven and then poured into 80° C. preheated plaque molds. Cured follow a typical 350° F. cure cycle where the temperature was increased at approximately 2° C./minute form 80° C. to 177° C. followed by hold for 3 hours after which the oven was switched off. The castings were left to cool down slowly to about 25° C.

Example 3

An epoxy resin composition consisting of DEN 438 (80 wt %)-DVBDO (5 wt %)-eCHTP (15 wt %) and hardener DDS was prepared. The amounts of epoxy resins and hardeners were DEN 438 (72 g, 403.4 mmol), DVBDO (4.5 g, 55.5 mmol), eCHTP (13.5 g, 65.7 mmol) and DDS (32.5 g, 524.6 mmol). This resin blend and castings made of were prepared likewise as described in Example 2.

The invention claimed is:

1. A curable composition comprising
   (a) at least one epoxide component comprising:
      (i) at least one solid or semi-solid epoxy novolac resin and at least one solid or semi-solid epoxidized cyclohexane tetraphenol; and
      (ii) at least one divinylarene dioxide resin compound in an amount of up to 20 weight percent, based on the weight of the epoxide compounds; and
   (b) at least one hardener selected from 4,4-diaminophenylsulfone, dicyandiamide or a mixture thereof;
   wherein the curable composition being cured comprises a cured thermoset product having a Tg of greater than 120° C.

2. The curable composition of claim 1, wherein the at least one divinylarene dioxide resin compound comprises divinylbenzene dioxide.

3. The curable composition of claim 1, wherein the at least one divinylarene dioxide resin compound has a viscosity of from about 1 mPa-s to about 20 mPa-s.

4. The curable composition of claim 1, including (c) at least one curing catalyst.

5. The curable composition of claim 1, including a filler, a reactive diluent, a flame retardant, a flexibilizing agent, a processing aide, a toughening agent, a curing catalyst or a mixture thereof.

6. The curable composition of claim 1 wherein the hardener is 4,4'-diaminophenylsulfone.

7. A process for preparing a curable composition comprising admixing:
   (a) at least one epoxide component comprising:
      (i) at least one solid or semi-solid epoxy novolac resin and at least one solid or semi-solid epoxidized cyclohexane tetraphenol; and
      (ii) at least one divinylarene dioxide resin compound in an amount of up to 20 weight percent, based on the weight of the epoxide compounds; and
   (b) at least one hardener selected from 4,4-diaminophenylsulfone, dicyanimide or a mixture thereof;
   wherein the curable composition being cured comprises a cured thermoset product having a Tg of greater than 120° C.

8. The process of claim 7 wherein the hardener is 4,4'-diaminophenylsulfone.

9. A process for preparing a curable composition comprising:
   (I) providing a mixture of:
      (a) at least one epoxide component comprising:
         (i) at least one solid or semi-solid epoxy novolac resin and at least one solid or semi-solid epoxidized cyclohexane tetraphenol; and
         (ii) at least one divinylarene dioxide resin compound in an amount of up to 20 weight percent, based on the weight of the epoxide compounds; and
      (b) at least one hardener selected from 4,4-diaminophenylsulfone, dicyanimide or a mixture thereof;
      wherein the curable composition being cured comprises a cured thermoset product having a Tg of greater than 120° C.; and
   (II) curing the curable composition of step (I).

10. The process of claim 9, wherein the curing step (II) is carried out at a temperature of from about 10° C. to about 290° C.

11. A cured thermoset article prepared by the process of claim 9.

12. The cured thermoset article of claim 11, wherein the Tg of the cured thermoset article comprises from about 120° C. to about 300° C.

13. The cured thermoset article of claim 11, wherein the percent char of the cured thermoset article comprises from about 10 to about 55 weight percent.

14. The cured thermoset article of claim 11, wherein the stress at failure of the cured thermoset article comprises from about 50 MPa to about 160 MPa.

15. The cured thermoset article of claim 11, wherein the modulus of the cured thermoset article comprises from about 2.6 MPa to about 3.3 MPa.

16. The cured thermoset article of claim 11 wherein the hardener is 4,4'-diaminophenylsulfone.

17. The process of claim 9 wherein the hardener is 4,4'-diaminophenylsulfone.

* * * * *